A. L. HAMILTON.
RUNNING GEAR FOR VEHICLES.
APPLICATION FILED JULY 30, 1907.
899,790.
Patented Sept. 29, 1908.
2 SHEETS—SHEET 1.
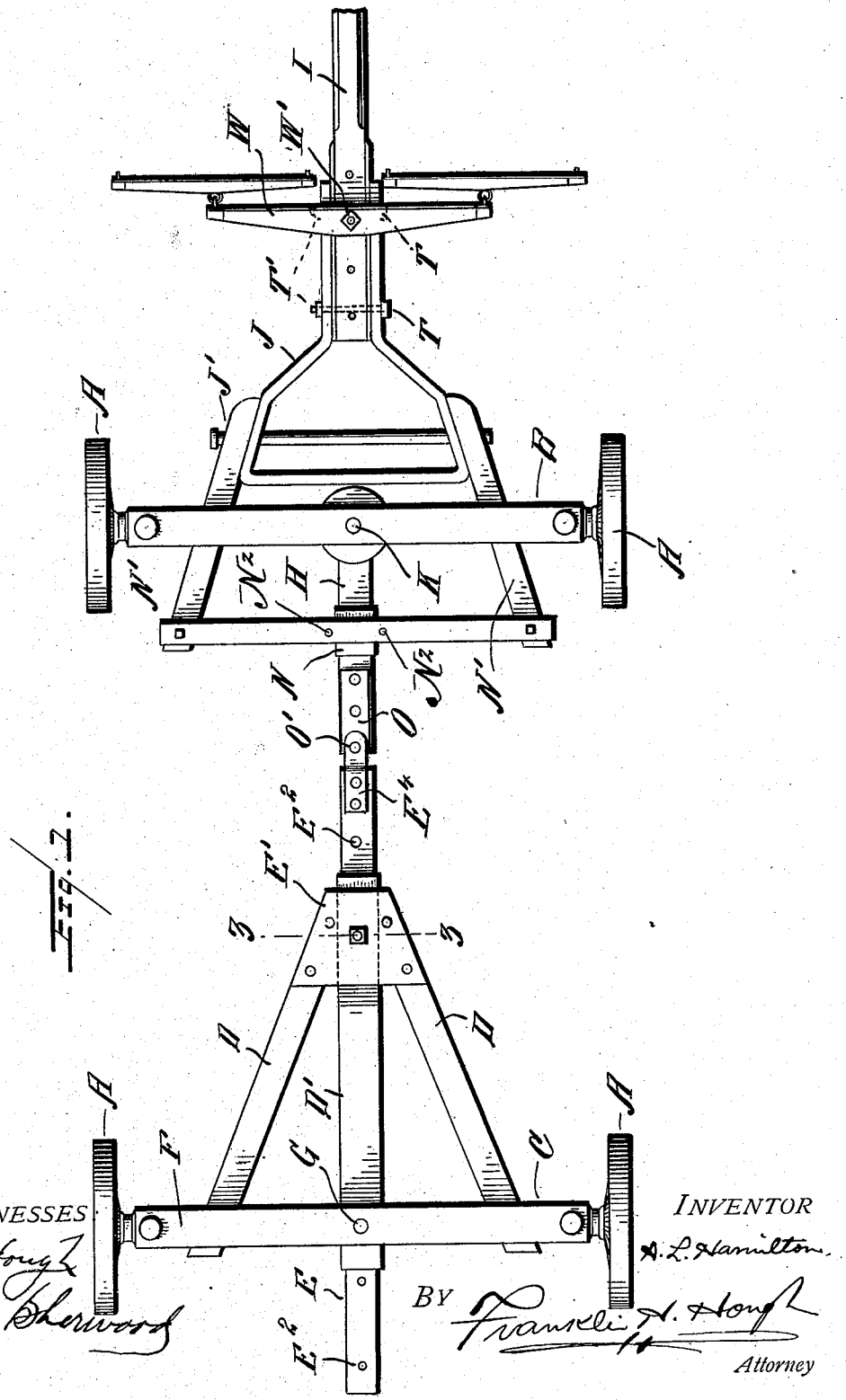
WITNESSES
INVENTOR
BY 
Attorney

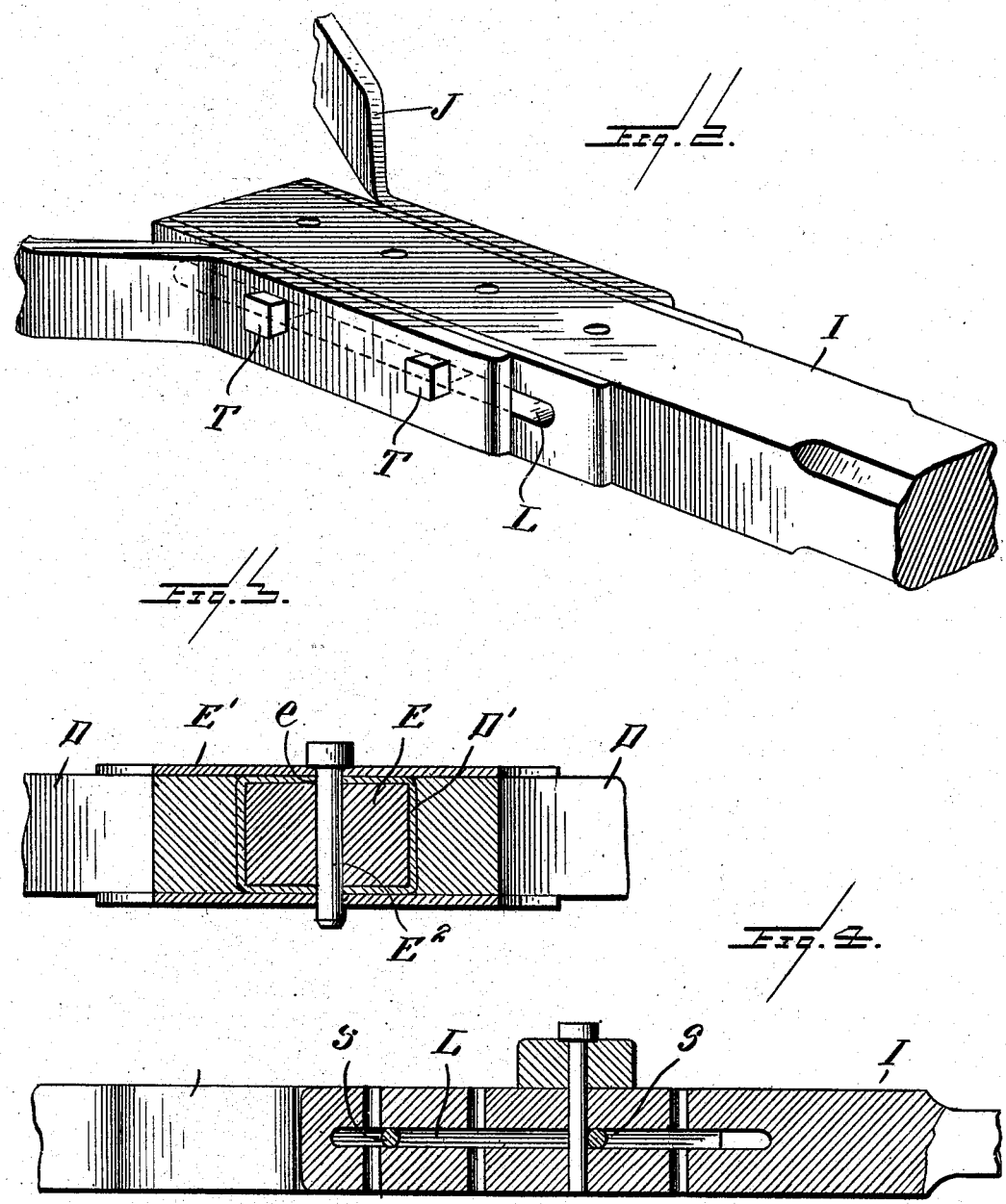

UNITED STATES PATENT OFFICE.

ABRAHAM LINCON HAMILTON, OF SUGARTOWN, LOUISIANA.

RUNNING-GEAR FOR VEHICLES.

No. 899,790.   Specification of Letters Patent.   Patented Sept. 29, 1908.

Application filed July 30, 1907. Serial No. 386,230.

*To all whom it may concern:*

Be it known that I, ABRAHAM L. HAMILTON, a citizen of the United States, residing at Sugartown, in the parish of Calcasieu and State of Louisiana, have invented certain new and useful Improvements in Running-Gear for Vehicles; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in running gear for vehicles and consists in the provision of various details of construction and combinations and arrangements of parts which will be hereinafter fully described and then specifically defined in the appended claims.

I illustrate my invention in the accompanying drawings, in which:—

Figure 1 is a top plan view of a running gear embodying the features of my invention. Fig. 2 is an enlarged detail perspective view of the tongue showing the manner of adjustment of the same. Fig. 3 is a cross sectional view on line 3—3 of Fig. 1 and Fig. 4 is a central longitudinal sectional view of the pole or tongue and tongue hound.

Reference now being had to the details of the drawings by letter, A—A designate the wheels of the running gear which are mounted on the front and rear axles, upon which latter the bolsters B and C are mounted.

D designates the hound which is fastened to the rear axle and is provided with a centrally disposed metallic shell D' adapted to conform to the shape of the reach section E, which is mounted to slide longitudinally therein, whereby the gear may be made extensible to adapt the running gear for various purposes. Said shell is provided with an aperture registering with an aperture $e$ in the plate E' and the reach section E is also provided with apertures $E^2$ through which apertures in the shell and reach section and also said plate a pin may be passed in order to hold the reach section in an adjusted position. Upon the rear axle of the running gear is a bolster F, preferably covered with a metallic sheathing, and is pivotally mounted upon a pin G which passes through registering apertures in the rear end of said shell and the rear axle.

H designates the forward reach section which is pivotally connected to a pin K passing through the front bolster and axle and is guided also in a shell N fastened between the two cross pieces of the forward hound N' and held from lateral movement by means of pins $N^2$ passing through said cross pieces. By the provision of the shell N, said forward reach section H is always held at right angles to the front axle.

O designates a clevis which is fastened to the rear end of the forward reach section and has a pin O' passing through the portion which projects rearward of the end of said forward reach section and is adapted to form means whereby the plates $E^4$ upon the rear reach section may be pivotally connected to the forward reach section, thereby forming means whereby the running gear may be turned about a curve within a small compass. To the forward ends of the hound, which is fixed to the forward axle, is a draft bar J pivotally mounted upon the rod J' and I designates a tongue having a suitable pole tip at one end and near its rear end is provided an elongated slot L. The arms of the tongue hound are apertured, as at S, for the purpose of receiving the clamping screws T, which are adapted to pass through said elongated slot in the tongue and the nuts T' upon the ends of said screws are tightened to clamp the two arms of the tongue hound with sufficient frictional force against the opposite sides of the tongue to hold the latter in an adjusted position, accordingly as it may be desired to adapt the tongue for use in connection with horses of different sizes. For instance, in the event of horses of considerable length, the tongue would be lengthened out and shortened correspondingly when used in connection with horses which are short. In order to protect the tongue from the parts of the tongue hound which are clamped thereto, any suitable wear plates of metal or other material may be interposed between the arms and the sides of the tongue to take up the wear.

A suitable evener W is held to the tongue by means of a pin W' passing through one or another of the apertures in the tongue. It will be noted that the pin W', which serves to hold the evener upon the tongue, will also serve as a means for positively preventing the tongue from moving forward in the event of the same slipping between the clamping arms of the tongue hound by said pin coming in contact with one of the clamping screws, which extend through the arms of the tongue hound and the tongue.

From the foregoing, it will be noted that, by the provision of a device as shown and described, a simple and efficient apparatus is afforded whereby a running gear may be adapted for use in turning curves within a short compass and, by the provision of the tongue, the gear may be readily adjusted for use in connection with horses of various sizes.

What I claim to be new is:—

In combination with the rear axle of the running gear of a vehicle, a hound connected to said axle, plates fastened to the opposite faces of the forward ends of said hound, an open ended shell interposed between said plates and the inner ends of the diagonal pieces of the hound, a reach section mounted within said shell, a bolt passing through registering apertures in said plates, shell and reach section, a forward axle and hound, a forward reach section pivotally connected to the forward axle, an open ended shell fastened to the forward hound and through which said forward reach section passes, a space intervening between said reach sections, and links pivotally connecting the reach sections, as set forth.

In testimony whereof I hereunto affix my signature in the presence of two witnesses.

ABRAHAM LINCON HAMILTON.

Witnesses:
  SAML. ROBERTSON,
  S. O. TURNER.